H. G. CARR.
HOG TRAP AND LOADING CHUTE.
APPLICATION FILED DEC. 27, 1909.

963,357.

Patented July 5, 1910.
2 SHEETS—SHEET 1.

Witnesses:
John O. Klein
J. H. Hutton

Inventor:
Howard G. Carr

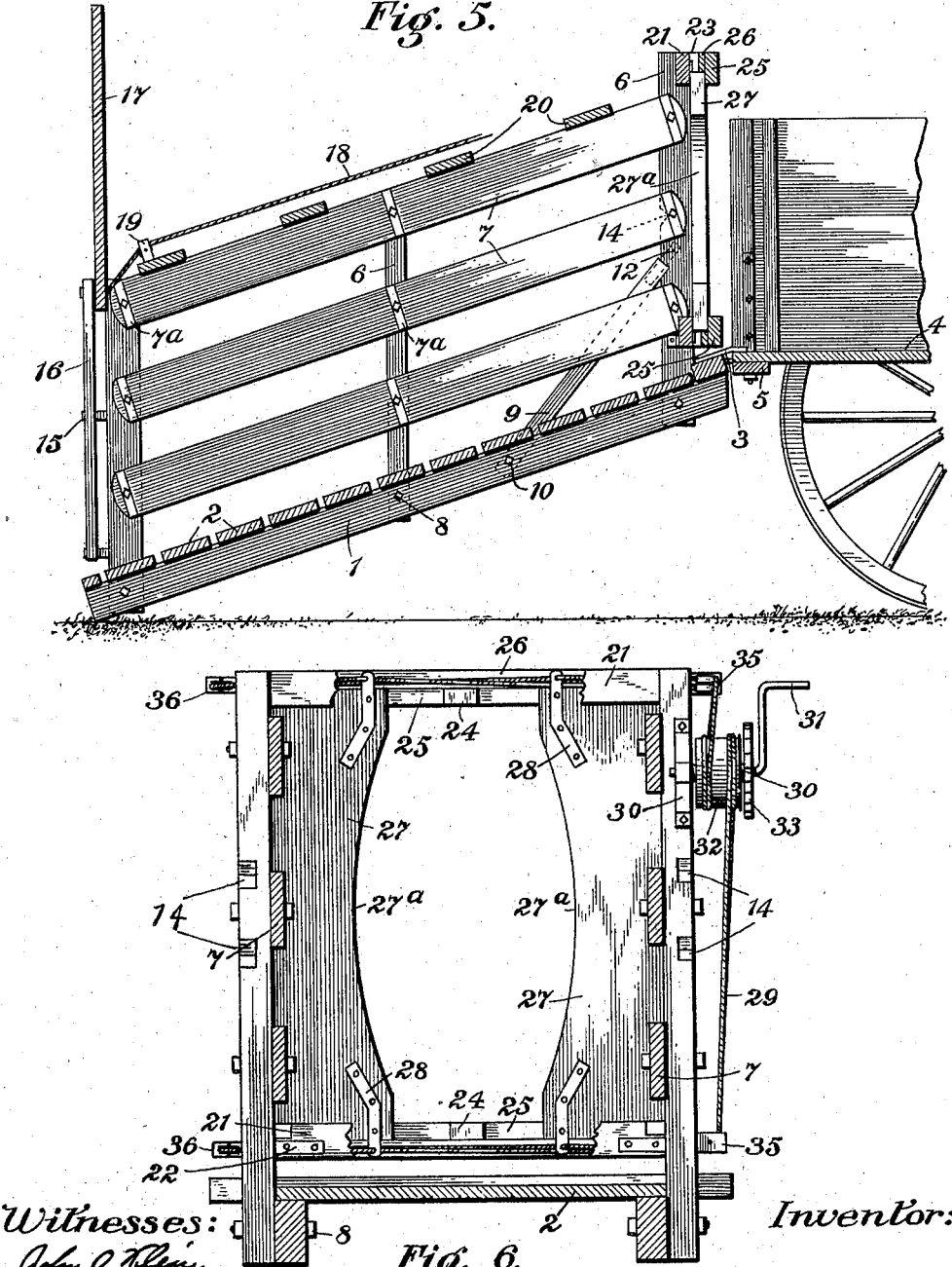

UNITED STATES PATENT OFFICE.

HOWARD G. CARR, OF HOOPESTON, ILLINOIS.

HOG TRAP AND LOADING CHUTE.

963,357.  Specification of Letters Patent. Patented July 5, 1910.

Application filed December 27, 1909. Serial No. 535,204.

*To all whom it may concern:*

Be it known that I, HOWARD G. CARR, a citizen of the United States, residing at 910 East Main street, in the city of Hoopeston, in the county of Vermilion and State of Illinois, have invented a new and useful Hog Trap and Loading Chute, of which the following is a specification.

My invention relates to that type of apparatus termed hog-trap and hog-loading chute; and the objects of my improvements are to provide such details of construction and aggregation of parts as to adapt the trap to hold a hog while ringing, or to provide an improved chute for loading hogs on or off of a wagon, vehicle or other places. These objects are attained in the following described manner as illustrated in the accompanying drawing, in which—

Figure 1:
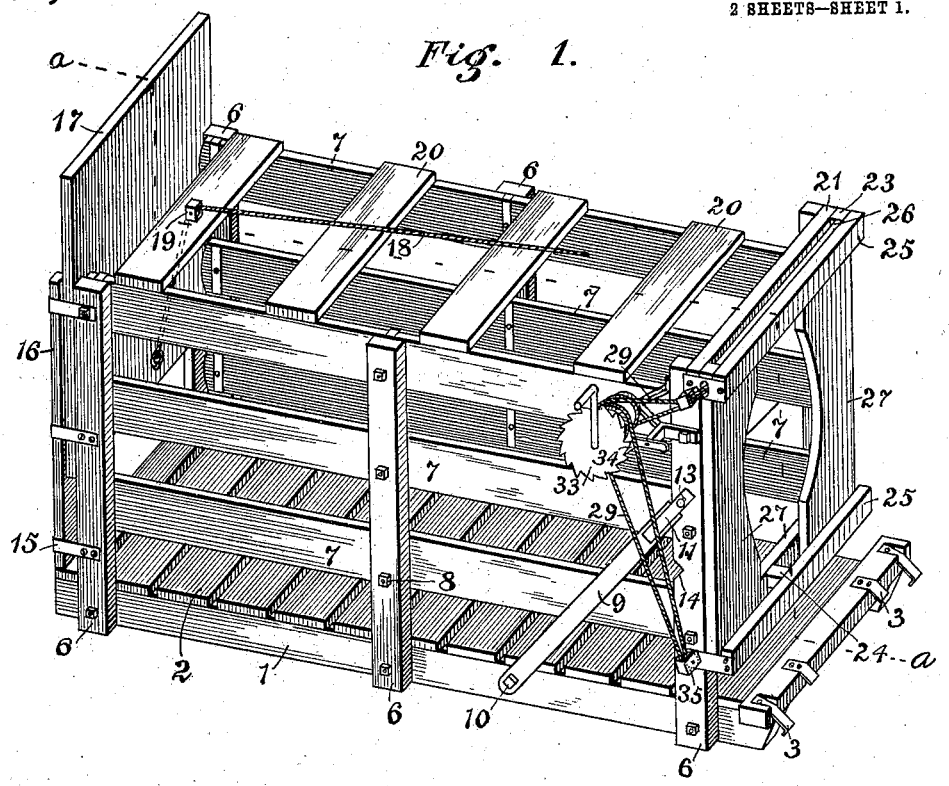
Figure 2:
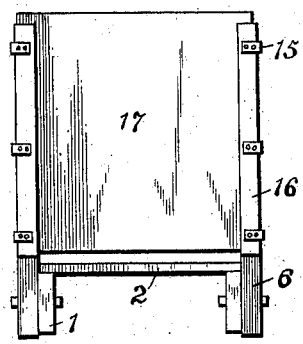
Figure 3:
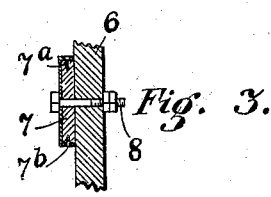
Figure 4:
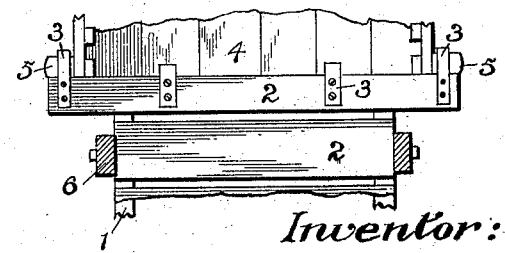

Figure 1 is a perspective view of the invention in position for use in ringing hogs. Fig. 2 is an elevation of the rear end. Fig. 3 is a detail sectional view showing reinforcement to the side members. Fig. 4 is a detail view of the front cross-bar with members for suspending the front end of the chute from a wagon bed, etc. Fig. 5 is a sectional view in detail from the line $a, a,$ in Fig. 1. Fig. 6 is a detail view of the front end of the trap.

Similar characters refer to similar parts throughout the several views.

The sills 1 and the floor 2 constitute the bottom of the trap. Secured to the forward floor piece 2 are the members 3 which protrude beyond the edge of floor 2 providing means of suspending the front end of the trap while being used as a chute, the members 3 resting on the bottom 4 of the wagon bed, the outer members 3 resting on the rear sill 5 of the wagon bottom and have their free ends turned downwardly so as to keep the trap in position in case the wagon should be moved unexpectedly forward.

The uprights 6 and the horizontal strips 7 constitute the sides of the trap. The uprights are pivotally secured to the sills 1 and the members 7 are pivotally secured to the uprights 6 with the bolts 8 so that the uprights 6 may be placed in a perpendicular position with the sills 1 either in a horizontal or an inclined position. The side members 7 are reinforced across the strips at the points where they are intersected with the bolts 8 by the metal straps $7^a$, which have each of their ends bent in an L shape and are secured to the members 7 by the screws $7^b$. The braces 9 are pivotally secured to the sills 1 with the bolts 10. Secured to the upper end of 9 are the straps 11 provided with the holes 12 for the reception of the pins 13. The upper ends of the braces may be placed in any of the plurality of the recesses 14 in the front upright 6 so as to give the desired angle to the members 6, after which they are secured by passing the pins 13 through the holes 12 in the straps 11 and the desired holes 14 in the front uprights 6.

Secured by the straps 15 to the rear uprights 6 are the subframes 16. In the spaces between the rear uprights 6 and the subframes 16 slides the door 17 which is raised or lowered with the rope 18 attached to the lower inner edge of the door and passed over the pulley 19. Secured to the upper members 7 are the top members 20. Secured to the forward uprights 6 are the cross pieces 21, the lower one being secured to the L straps 22 which in turn are secured to the front members 6. Secured to the members 6 at the point of intersection with the members 21 are the blocks 23. At the center of the crosspieces 21 are secured the blocks 24, and secured to the upper and lower blocks 23 and 24 are the cross pieces 25. Secured to the upper rear edge of the upper member 25 and extending downward to the lower edge of the upper blocks 23 are the strips 26. The lower edge of the lower member 25 has similar strips secured to it. In the grooves thus formed by the members 21, 25 and 26 slides the doors 27 which have countersunk in and secured to them at their inner corners the four straps 28, each being provided at its outer end with suitable holes for the reception of the cords 29. The straps 28 extend through the slots between the members 26 and 21.

Secured to the upper end of the right hand front upright 6 by the brackets 30 is the rotating shaft with crank 31, to which is secured the drum 32 and the ratchet wheel 33. Secured to the right hand brace 30 is the pawl 34 engaging the ratchet teeth on the ratchet wheel 33. Two cords 29 are secured near their respective centers to the drum 32. Each end is passed around the drum in an opposite direction from the other end of the same cord. The two ends of one of the cords are passed over the pulleys 35 at the upper end of the right hand front upright 6. The pulleys are two in number, one for each end of the cord 29. One end of the cord is secured at a suitable place on the cord to the strap 28 on the right hand slidable door 27, and then is passed around the pulley 36 at the upper end of the left front upright 6 and back and secured to the strap 28 on the left hand door 27. The other free end of the cord is then attached to the left hand strap 28. The other cord 29 is placed around the lower pulleys and attached to the doors 27 at their lower edges in the same manner as the upper cord. Thus it will readily be seen that by rotating the drum with the crank in one direction the doors 27 will move outwardly or away each from the other, and by rotating the drum in the other direction they will move toward each other. The inner edges of the doors 27 have the concave recesses 27$^a$.

In operation as a hog-ringing trap, (Fig. 1) the ends are placed in a perpendicular position and secured with the pins 13, and the braces 9. The door 17 is then raised with the rope 18 and the animal enticed into the trap and the door 17 dropped. The pawl 34 is then moved so as to release the ratchet wheel 33 and the drum 32 rotated with the crank 31 thereby sliding the doors 27 apart enough so as to induce the animal to try to make an exit between them and as it attempts to do so the drum is rotated in an opposite direction thereby closing the doors 27 tightly against the neck of the animal, the pawl 34 engaging the ratchet teeth and holding the animal securely until the operator places a ring in the snout of the animal, after which the drum is rotated so as to move the doors apart and allow the animal to pass out of the trap.

In loading hogs if one only is to be loaded and it is of the usual size it may be enticed into the trap and the uprights changed to the position as shown in Fig. 5 and secured as heretofore. The trap is then moved to the rear end of a prepared wagon and the forward end of the trap placed in position as in Fig. 5, the drum rotated so as to open the doors 27 and allow the animal to pass into the wagon, after which the doors are closed by rotating the drum, thereby keeping the animal from passing out into the chute as the end gates are being replaced in the wagon. This is an important feature in a hog loading chute. If a number of hogs are to be loaded the rear end of the trap is placed at the opening in the pen or building in which they are inclosed, the wagon backed to the front end of the trap or chute and the forward end of the chute is raised and placed in position on the rear end of the wagon bed as hereinbefore described, the doors at each end are opened and the hogs driven through the chute into the wagon. Usually only a part of a load will go in at once, and while the others are being driven into the chute, those in the wagon will leave it and pass down the chute. This is obviated entirely in my improvement in a hog-loading chute by the doors 27 and the rotating drum and its attachments operating said doors.

I claim:—

1. In a hog-trap and a hog loading chute combined, the combination of a bottom with straps at the front end for suspending the chute from a wagon, etc., uprights pivotally attached to the sills of said bottom, a plurality of reinforced side members of the trap pivotally attached to said uprights, two braces pivotally attached to the sills of the trap with their upper ends fitted with a strap having holes for the reception of pins for holding the sides of the trap in position, and a plurality of top members secured to the upper edges of the upper side members.

2. In a hog-trap and loading chute, the combination of a bottom, sides pivotally attached to said bottom, a top attached to said sides, rear uprights of said sides pivotally secured to said bottom at opposite sides thereof, subframes secured by straps thereto, a door slidably mounted therein, and means for raising or lowering said door.

3. In a hog-trap and loading chute, the combination of a bottom, means of supporting the front end of said bottom, sides pivotally attached to said bottom, front uprights of said sides pivotally secured to said bottom at opposite sides thereof, crossbars attached thereto, two slidably disposed doors mounted therein, said doors having straps secured one at each inner corner thereof, said straps having means for operating said doors each to or from the other secured thereto, braces between said uprights and bottom, said uprights having a plurality of notches for the reception of the upper ends of the braces for holding the uprights in the desired position and having a plurality of holes for the reception of pins for securing the braces to the uprights, and removable pins therefor.

4. In a hog-trap or a loading chute, the combination of a bottom and sides, front uprights of said sides secured to said bottom at opposite sides thereof, top and bottom crossbars attached thereto, two slidably disposed doors mounted therein, means of sliding said doors each to or from the other, one of said uprights having attached thereto brackets, a rotatable shaft and drum constrained to rotate therewith supported thereby, cords secured to said drum forming an operative connection between said drum and said doors, means for rotating said shaft, a ratchet wheel secured to said drum, a pawl in mesh with said ratchet wheel, a plurality of pulleys attached to said uprights for the reception of the hereinbefore mentioned cords.

In testimony whereof, I the said HOWARD G. CARR have hereunto set my hand.

HOWARD G. CARR.

Witnesses:
JOHN O. KLEIN,
GEORGE W. DULEY.